United States Patent
Kang et al.

(10) Patent No.: US 11,962,825 B1
(45) Date of Patent: Apr. 16, 2024

(54) CONTENT ADJUSTMENT SYSTEM FOR REDUCED LATENCY

(71) Applicant: Amazon Technologies, Inc., Seattle, WA (US)

(72) Inventors: Min Kyoung Kang, Seattle, WA (US); Ronil Sudhir Mokashi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/935,865

(22) Filed: Sep. 27, 2022

(51) Int. Cl.
| | |
|---|---|
| *H04N 21/25* | (2011.01) |
| *G06N 20/20* | (2019.01) |
| *H04N 21/45* | (2011.01) |
| *H04N 21/462* | (2011.01) |
| *H04N 21/845* | (2011.01) |

(52) U.S. Cl.
CPC .......... *H04N 21/251* (2013.01); *G06N 20/20* (2019.01); *H04N 21/4508* (2013.01); *H04N 21/4621* (2013.01); *H04N 21/8456* (2013.01)

(58) Field of Classification Search
CPC .... G06N 20/20; G06N 20/00; H04N 21/4621; H04N 21/8456
See application file for complete search history.

(56) References Cited

U.S. PATENT DOCUMENTS

| | | | |
|---|---|---|---|
| 8,341,255 B2 | 12/2012 | Gopalakrishnan | |
| 9,137,278 B2 | 9/2015 | Strasman | |
| 9,444,870 B2 | 9/2016 | Phillips et al. | |
| 10,178,043 B1* | 1/2019 | Ganjam | H04L 65/764 |
| 10,277,928 B1 | 4/2019 | Joliveau et al. | |
| 10,771,855 B1* | 9/2020 | Joliveau | H04N 21/4424 |
| 2008/0043697 A1 | 2/2008 | Huomo et al. | |
| 2008/0273591 A1 | 11/2008 | Brooks et al. | |
| 2009/0031384 A1 | 1/2009 | Brooks et al. | |
| 2009/0184962 A1 | 7/2009 | Kuriakose et al. | |
| 2010/0135419 A1 | 6/2010 | Doser et al. | |
| 2011/0082946 A1 | 4/2011 | Gopalakrishnan | |
| 2011/0235703 A1 | 9/2011 | Labrozzi et al. | |
| 2012/0054876 A1 | 3/2012 | Johansson | |
| 2012/0278496 A1 | 11/2012 | Hsu | |
| 2012/0278833 A1 | 11/2012 | Tam | |
| 2013/0067109 A1 | 3/2013 | Dong et al. | |
| 2013/0080267 A1 | 3/2013 | McGowan | |

(Continued)

OTHER PUBLICATIONS

Du, Haipeng, et al. "Dynamic Push for HTTP Adaptive Streaming with Deep Reinforcement Learning." 2021 IEEE 27th International Conference on Parallel and Distributed Systems (ICPADS). IEEE, 2021. (Year: 2021).*

*Primary Examiner* — Caroline H Jahnige
(74) *Attorney, Agent, or Firm* — Weaver Austin Villeneuve & Sampson LLP

(57) ABSTRACT

Techniques for reducing the latency of content retrieval from a content delivery network include receiving a request from a client device for media content, parsing the request for attributes associated with the request and the client device, and providing the attributes to a machine learning model to perform server-side prediction of an estimated retrieval time of the media content. A quality level for the media content is determined based on the estimated retrieval time, and the requested media content is provided to the client device at the determined quality level.

22 Claims, 7 Drawing Sheets

(56) References Cited

U.S. PATENT DOCUMENTS

| | | |
|---|---|---|
| 2013/0091249 A1 | 4/2013 | McHugh et al. |
| 2013/0156094 A1 | 6/2013 | Syed et al. |
| 2013/0179588 A1 | 7/2013 | McCarthy et al. |
| 2013/0198342 A1 | 8/2013 | Xu et al. |
| 2013/0212223 A1 | 8/2013 | Ur |
| 2013/0219423 A1 | 8/2013 | Prickett et al. |
| 2013/0254341 A1 | 9/2013 | Ramakrishnan |
| 2014/0098182 A1 | 4/2014 | Kramarenko et al. |
| 2014/0129618 A1 | 5/2014 | Panje et al. |
| 2014/0310424 A1 | 10/2014 | Andersson et al. |
| 2014/0365889 A1 | 12/2014 | Lipman et al. |
| 2015/0019968 A1 | 1/2015 | Roberts et al. |
| 2015/0085875 A1 | 3/2015 | Phillips et al. |
| 2015/0089557 A1 | 3/2015 | Busse |
| 2015/0101003 A1 | 4/2015 | Bull et al. |
| 2015/0113407 A1 | 4/2015 | Hoffert et al. |
| 2015/0146012 A1 | 5/2015 | Shipley et al. |
| 2015/0317353 A1 | 11/2015 | Zavesky |
| 2016/0088322 A1 | 3/2016 | Horev et al. |
| 2016/0127260 A1 | 5/2016 | Gordon |
| 2016/0286249 A1 | 9/2016 | Phillips et al. |
| 2016/0294898 A1 | 10/2016 | Wheelock |
| 2017/0078744 A1 | 3/2017 | Vanblon et al. |
| 2019/0342591 A1* | 11/2019 | Nilsson ............ H04N 21/23439 |
| 2023/0093174 A1* | 3/2023 | Huang .................... H04L 65/75 709/231 |
| 2023/0133880 A1* | 5/2023 | Paliwal ............ H04N 21/44004 709/231 |

* cited by examiner

CONTENT ADJUSTMENT SYSTEM FOR REDUCED LATENCY

BACKGROUND

Content delivery networks (CDNs) are supporting an ever-increasing array of options for consumption of media content, in terms of the types of media content (e.g., video, audio, images, etc.), providers of the media content, and client devices for consuming the media content. As demand for high quality content (e.g., high resolution, high bit-rate, etc.) grows, communication networks and clients devices are also being upgraded to provide support for delivery of such content. Despite efforts to ensure a seamless user experience, content delivery to client devices can still suffer from long retrieval times due to network congestion and data transmission latencies.

BRIEF DESCRIPTION OF THE DRAWINGS

Various embodiments in accordance with the present disclosure will be described with reference to the drawings, in which.

DETAILED DESCRIPTION

Media content (e.g., movies, television shows, videos, music, podcasts, etc.) can be streamed over networks using adaptive bitrate streaming for playback on a client device. Adaptive bitrate streaming includes determining the client device's network bandwidth in real time and adjusting the quality of the media content that is requested from a content server and played back on the device to account for changes in the bandwidth. However, the heuristic algorithms for bitrate selection reside on the client device, and there can be a delay between a client device's initial request for the content, and when the client device figures out the network condition and is able to react to the network condition. Furthermore, client-side adaptive streaming limits the content server's ability to control the bitrate provided to the numerous client devices serviced by the content server.

The techniques disclosed herein provide server-side content adjustment to reduce latencies for content retrieval in content delivery networks. The sever-side content adjustment techniques employ a machine learning model trained with historical latencies to predict retrieval times for content requests. By enabling the server to predict content retrieval times, the server can adjust the content quality and hence the bitrate to accommodate network conditions without relying on heuristic algorithms residing on the client device. This improves the user experience because the content server can proactively adjust the content quality to reduce content retrieval times as opposed to relying on the client device reacting to long latencies only after experiencing slow retrieval times. Hence, content can be delivered to the client device at the suitable bitrate from the start without requiring subsequent intervention from the client device.

In the description herein, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
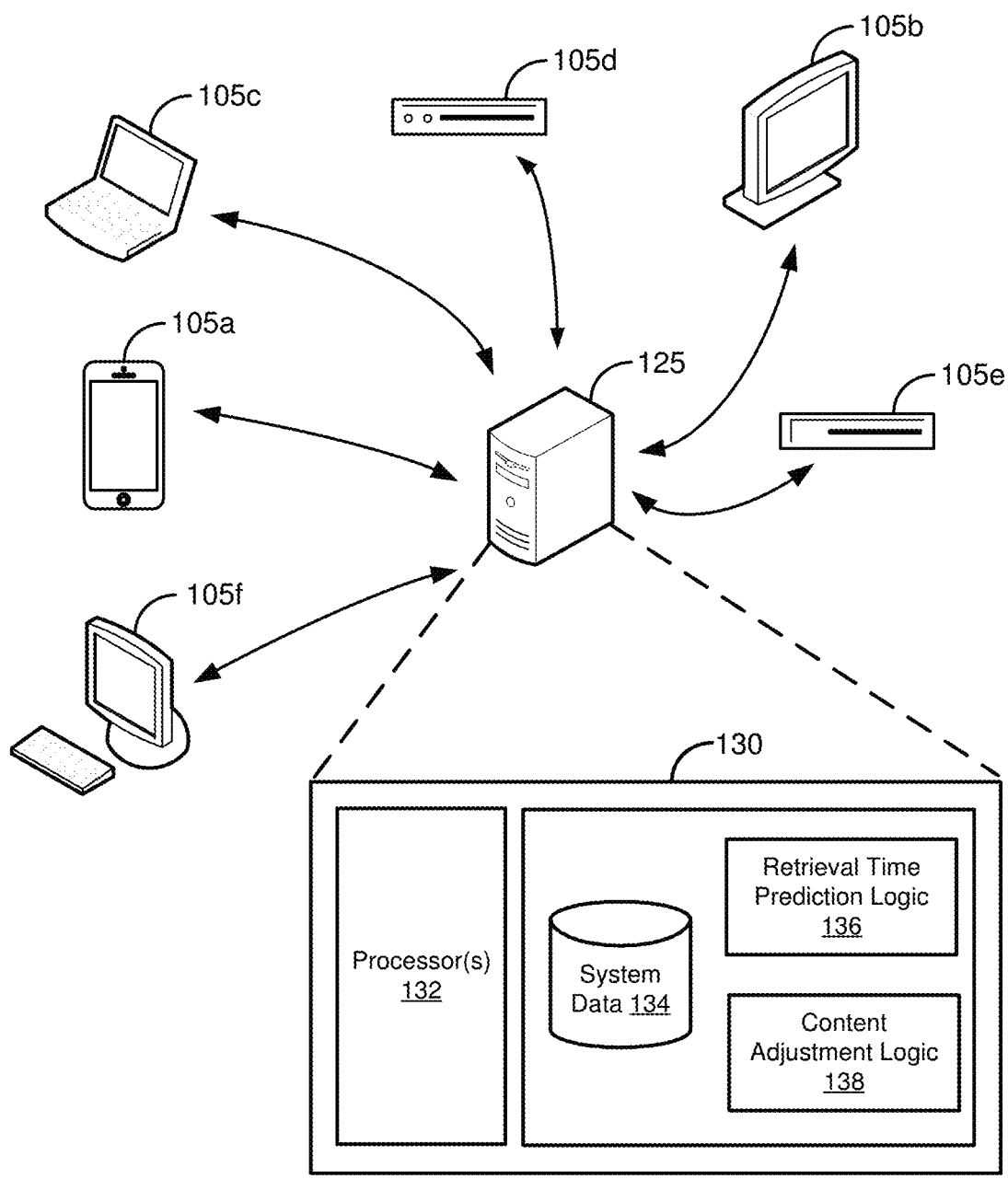
FIG. 1 illustrates an example of a computing environment for media content delivery.

FIG. 1 illustrates an example of a computing environment 100 for media content delivery. The computing environment of FIG. 1 includes content server 125 which can be used to provide media content for playback on client devices 105*a-e*. Although content server 125 is shown as a single device, it should be understood that content server 125 can represent a set of network-connected content servers and network components to deliver media content to client devices 105*a-e*. By way of example, client device 105*a* can be a smartphone, client device 105*b* can be a television, client device 105*c* can be a laptop computer, client device 105*d* can be a set-top box, client device 105*e* can be a gaming console, and client device 105*f* can be a desktop computer. Other types of client devices such as tablets, wearable devices (e.g., smart watches), virtual reality headsets, etc. may also be included in the computing environment 100.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Content server 125 can be part of a content delivery system that conforms to any of a wide variety of architectures. The functionality and components of content server 125 can use one or more servers and be deployed at one or more geographic locations (e.g., across different countries, states, cities, etc.) using a network such as any subset or combination of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein may also be implemented by one or more of different entities. For example, the functionality to provide playback of media content can be integrated into a video player or software client under control of one entity (e.g., on viewer devices 105*a-e*), integrated into a separate application from another entity (e.g., a streaming service provider), implemented in an edge server or content server of a CDN, a server of an Internet service provider (ISP), etc.

Content server 125 can include one or more processor(s) 132, system data 134, retrieval time prediction logic 136, and various types of logic used to provide media content for playback at viewer devices 105*a-f*. In FIG. 1, content server 125 can include storage to store media content and playback handling logic to provide the media content to viewer devices 105*a-f*. In some implementations, content server 125 can be an edge server of a content delivery network (CDN), and the media content can be retrieved from a separate server (e.g., original server) of the CDN accessible by content server 125, and be cached in content server 125. In some implementations, system data 134 and/or retrieval time prediction logic 136 can also be stored in different servers of the CDN.

System data 240 may include contextual information of media content requests made across multiple client devices and multiple client device types. For example, the contextual information may include time information of the requests such as date, time (e.g., hour of the day), and day of week of when the content request was made; client device information such as the location of the client device, the type of client device making the content request (e.g., mobile phone, tablet, set top box, television, etc.), resolution or content quality supported by the client device (e.g., 1080p, 4K, 8K, etc.), hardware and software capabilities of the client device (e.g., memory capacity, processing speed, available media decoders, etc.); network information such as IP address, ISP provider, uniform resource locator (URL) of content being requested; as well as the content type (e.g., video, audio, image, etc.), the original resolution and/or quality of the content being requested, and the retrieval times of the requested content.

In some implementations, the content retrieval times can be provided by the client devices as part of a data collection process performed by the CDN. For example, the client devices can monitor the latency between making a request for content and receiving the content at the client device, and provide the latency data to content server 125. In some implementations, the content retrieval times can be detected by content server 125, for example, by determining the round-trip delay of sending a network packet to the client device and receiving an acknowledgment packet from the client device. In some implementations, the data within system data 240 can include data collected from other servers, and be provided from a variety of other sources.

Retrieval time prediction logic 136 is used to analyze incoming content requests and estimate a content retrieval time for the incoming content requests. Retrieval time prediction logic 136 can be implemented using a machine learning model. The machine learning model can be trained using system data 134 as historical training data. In some implementations, the machine learning model can be a gradient boosted tree regression model. The types of contextual information collected are various and their relationships to the retrieval time can be highly non-linear. As such, a tree-based machine learning model is used to account for such complex relationships among content request attributes and retrieval times. Given the time for retrieval is non-negative and may have high variance, a Poisson loss function can be used for the model training. If the mean dispersion of the retrieval times is high, a negative binomial loss function can be used.

The boosted tree model is built sequentially by updating the model to adjust for residuals from the previous version of model. In some implementations, the hyperparameters of the machine learning model (e.g., learning rate, depth of tree) can be tuned using cross-validation in which the training data (e.g., system data 134) can be split into subsets in which a subset of the data is used for training, and a different subset of the data is used to validate or test the machine learning model to derive residuals for the training iterations. To take into account the dynamic nature of network performance over time and advances in client device capabilities, the machine learning model can be retrained periodically (e.g., monthly, quarterly, bi-annually, etc.) using contextual information from new content requests that have not been processed by the machine learning model (e.g., content requests that have not been subjected to the retrieval time prediction).

Content adjustment logic 138 maps the predicted retrieval time estimate to a suitable quality of the media content to deliver to the client device. Given a retrieval time estimate, content adjustment logic 138 uses a rule-based algorithm based on the workload type of request to determine the suitable quality level among various available options to deliver the requested content in. The available quality options can be categorized, for example, into high, medium, and low. In other implementations, a different number of quality levels can be used, and the number of quality levels can be different for different types of workload (e.g., image, audio, video).

When a new incoming content request is received by content server 150, attributes of the request can be parsed from the request and inputted into the retrieval time prediction logic 136. The estimated retrieval time predicted by the retrieval time prediction logic 136 can be provided to the content adjustment logic 138 to determine the suitable quality level of content to provide to the client device making the content request. Content corresponding to the determined quality level can then be delivered to the client device to minimize the retrieval time based on historical data of similar content requests.

Figure 2:
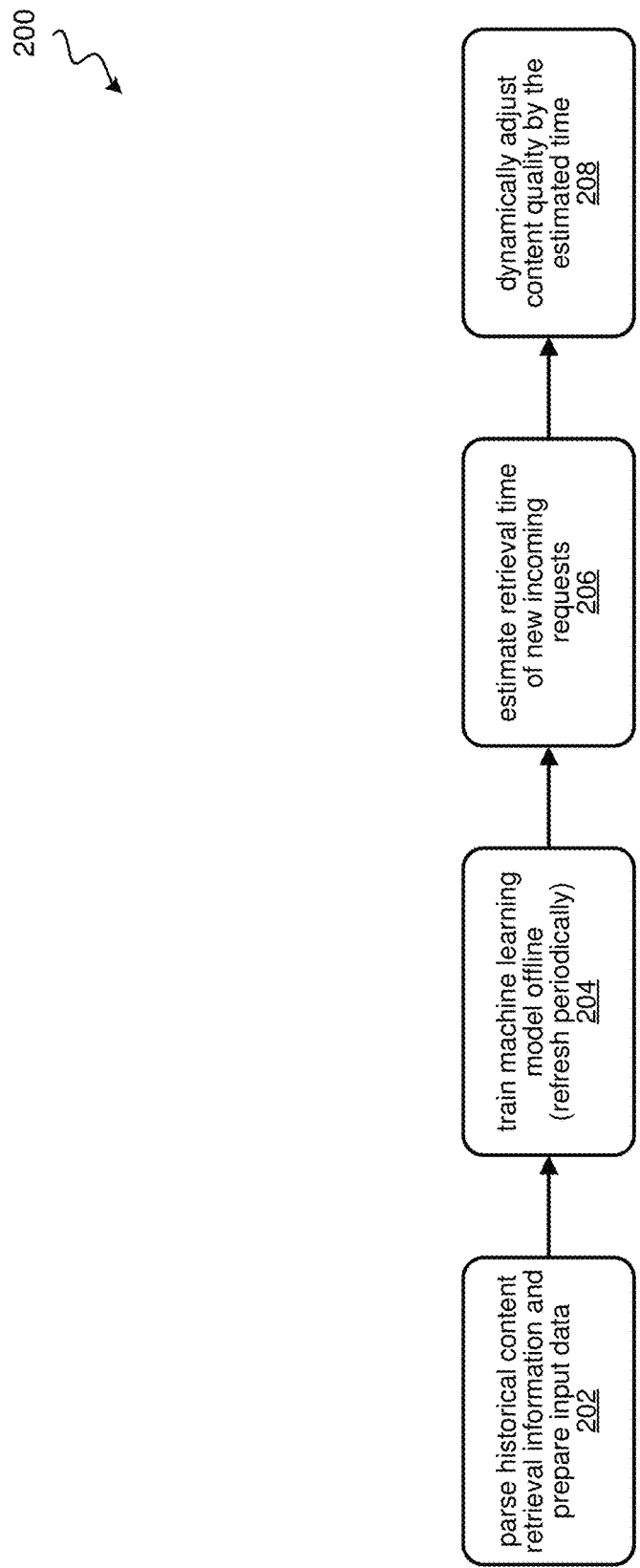
FIG. 2 illustrates an example of a process for improving content retrieval times.

FIG. 2 illustrates a high-level flow diagram of a dynamic content adjustment technique 200. The dynamic content adjustment technique 200 may include parsing historical content retrieval information and preparing input data to train a machine learning model at block 202. The training data can be obtained, for example, by collecting information on historical requests from client devices for streaming media content, and the corresponding historical content retrieval times for the historical requests. Block 202 may extract a set of attributes from the historical requests including the contextual information of the content requests as described with referent to system data 134. For example, block 202 may parse the content requests to obtain time information, network information, client device information, as well as the type of content being requested, and the original resolution of the content being requested. For categorical data, one-hot encoding can be used to convert the categorical data into numerical values so that the machine learning model can consume the information correctly. For example, the client device type (e.g., smartphone, tablet, computer, television, etc.) can be encoded using one-hot encoding to convert each device type to a numeric value.

At block 204, the machine learning model is trained offline using the training data prepared at block 202. In some implementation, the machine learning model can be a gradient boosted tree regression model. The gradient boosted tree model can be trained by initializing a decision tree, determining the residual (the difference between the decision tree predictions and the actual retrieval times), and then updating the decision tree by adding an additional sub-tree to the model. In some implementations, the residual can be computed using a Poisson loss function. The process can be repeated until the tree reaches a certain tree depth, or until the predicted retrieval times is validated to be within a certain threshold of the actual retrieval times. In some implementations, the data being used to train the machine learning model, and the data being used for validation of the machine learning model can be different subsets of the training data. The machine learning model can also be periodically retrained such as being retrained monthly, quarterly, bi-annually, etc.

At block 206, new content requests can be received and an estimate of the content retrieval time of each of the new incoming requests can be predicted by the trained machine learning model. For example, attributes can be parsed from each of the new content requests. The attributes may include time information of the new request, network information, client device information, type of media content being requested, etc. The time information may include date, time (e.g., hour of the day), and day of week of when the content request was made. The network information may include IP address of the client device, ISP provider, uniform resource locator (URL) of content being requested. The client device information may include a client device type, location information of the client device, and/or processing of the client device. The attributes may also include the content type (e.g., video, audio, image, etc.) of the content being requested. The attributes can be inputted into the machine learning model, and the machine learning model can generate a predicted retrieval time for each new content request.

At block 208, the quality of the requested content can be dynamically adjusted based on the estimated retrieval times. For example, the possible retrieval times can be split into different ranges, and each range can map to a corresponding quality level of the content. In some implementations, different content types can have different mappings of retrieval times to quality levels. Different content types can also have different number of retrieval time ranges and corresponding quality levels. By way of example, in some implementations, the quality levels can be categorized into high, medium, and low. In other implementations, a finer granularity of quality levels and hence a greater number of quality levels can be used. For example, for video content, the different quality levels may include 480i, 720p, 1080p, 4K, 8K resolutions that are each mapped to a different retrieval time range. Generally, the retrieval time has an inverse relationship with the quality level. In other words, the longer the estimated retrieval time is, the lower the quality level of content that is selected for the content request. In some implementations, the cost of network bandwidth may also be considered. For example, a lower quality level can be selected for more expensive networks, whereas a higher quality level can be selected for less expensive networks.

Figure 3:
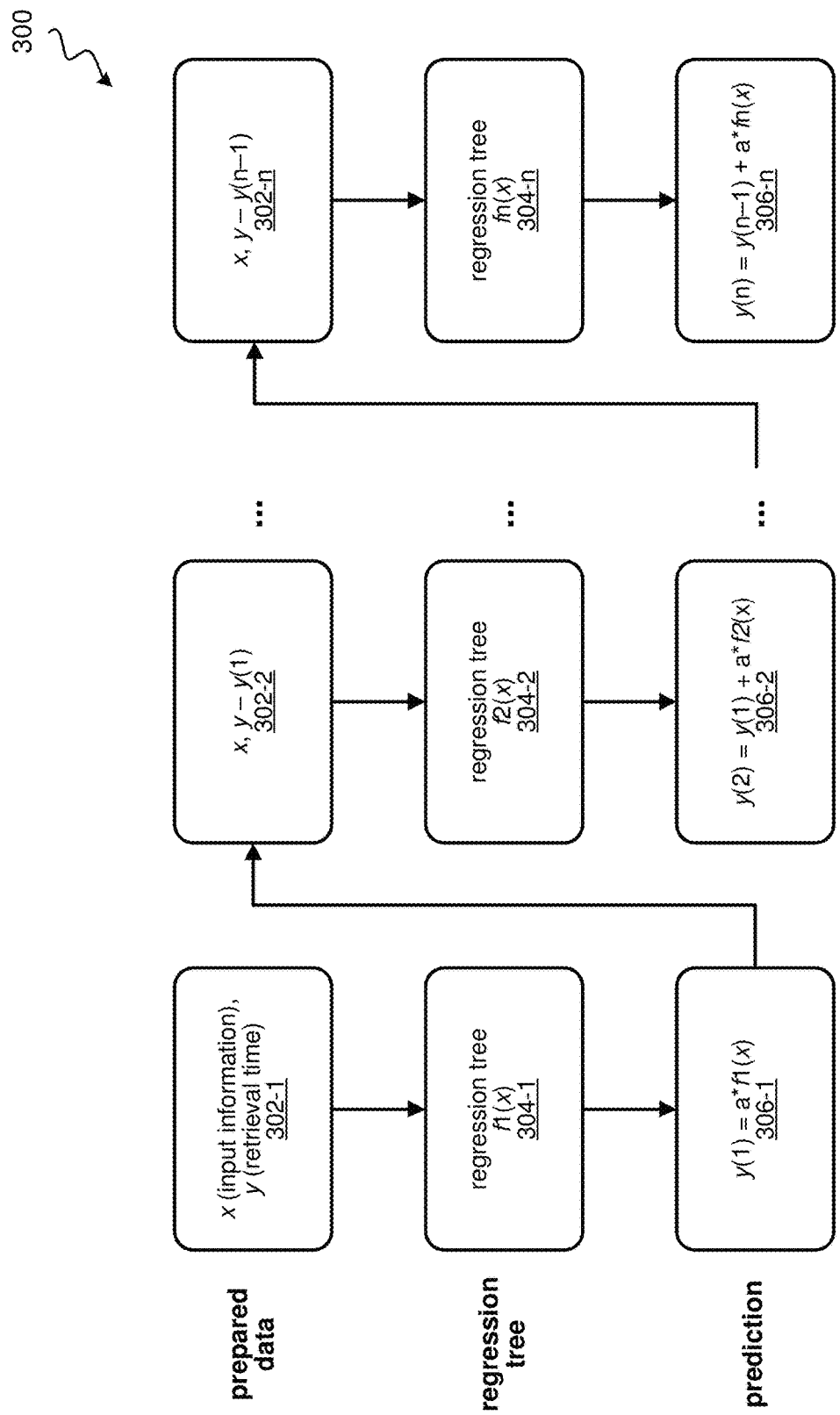
FIG. 3 illustrates an example of a process for generating a machine learning model to predict retrieval times.

FIG. 3 illustrates a conceptual diagram of an example of a process 300 to generate a gradient boosted tree regression machine learning model $y_i$. The gradient boosted tree regression machine learning model 300 can be generated by assuming a tree model f. The mean estimated time of content retrieval for a given particular context over a set of observed attributes x can be formulated as $f(x)=\lambda$. The probability that it would take a certain time $y_i$ to retrieve a content with context $x_i$ can be formulated as $$p(y=y_i \mid x_i; f) = \frac{e^{-exp(f(x_i))}[exp(f(x_i))]^{y_i}}{y_i!}$$

following the Poisson distribution. The logarithm of the probability to facilitate the calculation is taken and the log-likelihood (negative loss) based on all observed data using tree model can be represented as $$\text{argmin}_f \left( -\sum_{i=1}^{n} [-exp(f(x_i)) + y_i f(x_i) - \log(y_i!)] \right)$$

By minimizing the loss (maximizing log-likelihood given the observed data), the regression trees can be obtained iteratively.

Referring to FIG. 3, during a first iteration of the training process to generate the gradient boosted tree model, the input information x representing the contextual information of the content requests, and the retrieval times y are prepared for the regression tree model at block 302-1. The set of input information x is inputted into the initial regression tree f1(x) at block 304-1. The initial prediction of retrieval times using the initial regression tree is given as y(1)=a*f1(x) at block 306-1, where a is the learning rate.

During a second pass of the training process, the input information x representing the contextual information of the content requests, and the residual of the retrieval times y−y(1), which is the difference between the actual retrieval times y and the previous predictions y(1), are prepared for the next iteration of the regression tree model at block 302-2. The set of input information x is inputted into the next iteration of the regression tree f2(x) at block 304-2. The prediction of retrieval times using the next iteration of the regression tree is given as y(2)=y(1)+a*f2(x) at block 306-2, in which the initial tree y(1) is boosted by f2(x) taking into account the residual.

The training process can continue until a certain tree depth n is reached as shown with blocks 302-n to 306-n. In some implementations, the tree depth n and the learning rate a can be tuned using cross-validation in which the training data are split into different subsets in which certain subsets of the data are used for training, and other subsets of the data are used to validate or test the gradient boosted tree model to derive residuals for the training iterations.

Figure 4:
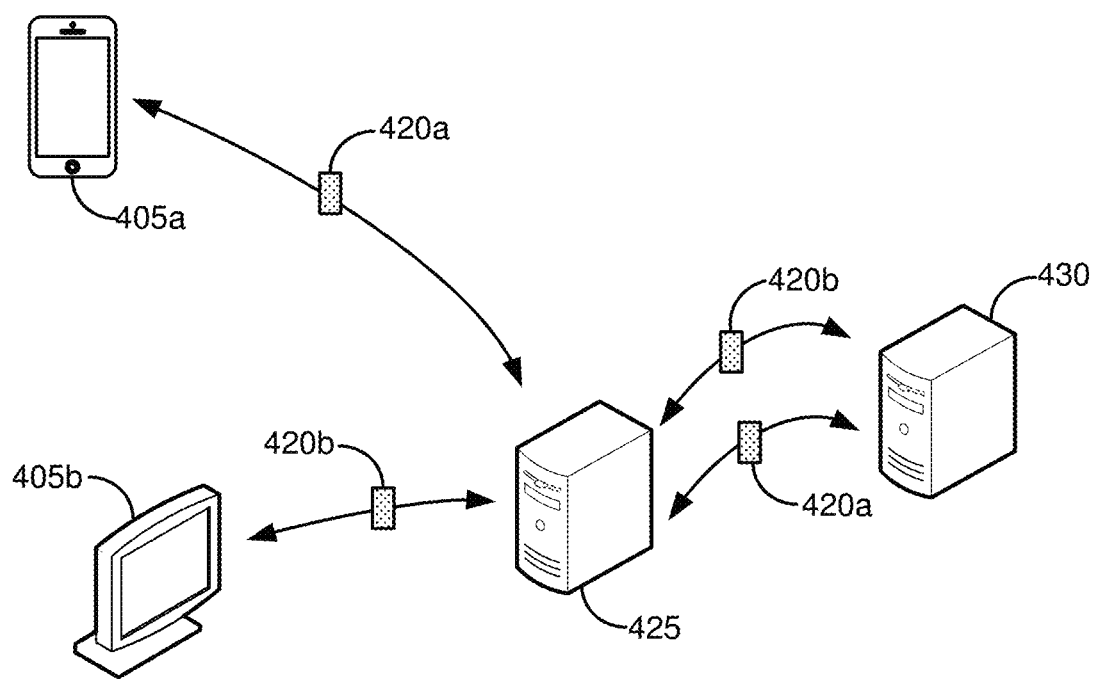
FIG. 4 illustrates another example of a computing environment for media content delivery.

FIG. 4 illustrates another example of a computing environment 400 for media content delivery. In some implementations, when a client device requests media content from a content delivery network, the client device can be given a manifest file that contains a listing of media content fragments and metadata such as URLs for retrieving the content fragments. The client device can stream the media content by accessing the designated URLs in the manifest file to retrieve the content fragments that make up the requested media content. The dynamic content adjustment technique described herein can utilize the manifest file to direct the client device to access content at the quality level determined suitable for the client device based on the contextual information of the request.

Referring to FIG. 4, client device 405a can be a mobile device such as a smartphone, and client device 405b can be a television. Client devices 405a and 405b can both request playback of the same media content (e.g., a newly released movie on the CDN that both devices subscribe to) by providing requests to content server 425. Content server 425 can parse attributes from the requests, and provide the attributes to the retrieval time prediction logic (e.g., gradient boosted tree machine learning model) of content server 425. The retrieval time prediction logic can determine the estimated retrieval times for the requested content based on attributes associated with the requests and the respective client devices. The estimated retrieval times can then be provided to content adjustment logic of content server 425 to determine respective quality levels for the content to be streamed to client devices 405a and 405b.

Content server 425 can provide manifest server 430 with the title (or other type of identifier) of the requested media content and the determined quality levels of the requests. Manifest server 430 can then generate manifest files 420a and 420b accordingly, and provide them to the respective client devices 405a and 405b. Each manifest file can contain metadata that allows the viewer device to generate properly formatted requests for specific fragments of the media content. A sequence of fragments together provides playback of the full media content. Audio portions of the media content can also be provided in fragments. Additional information, such as available subtitles, can also be provided in the manifest file. If the media content being requested includes both audio and video, a quality level can be determined separately for the audio and video, and the manifest file can include metadata for accessing the audio at the determined audio quality level and metadata for accessing the video at the determined video quality level.

In some implementations, the functionalities of content server 425 and manifest server 430 can be integrated into the same server. The functionalities of content server 425 and/or manifest server 430 can also be distributed amongst other servers. For example, content server 425 can be an edge server that interfaces with client devices, and the retrieval time prediction logic (e.g., machine learning model) can reside on a separate server.

Figure 5:
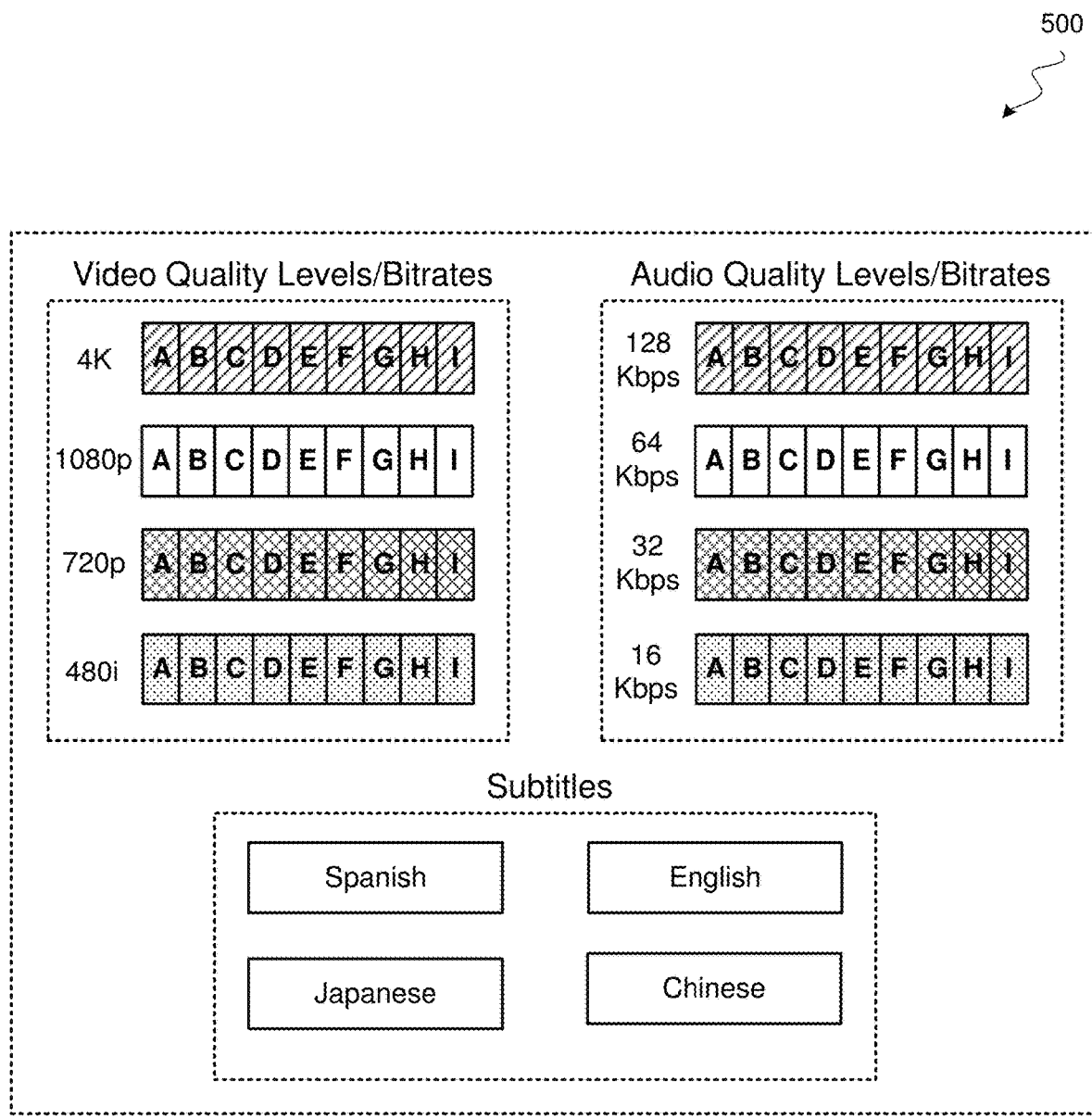
FIG. 5 illustrates an example of data sources for a manifest file.

FIG. 5 illustrates an example of manifest data sources 500 for generating a dynamic manifest file for playback of media content (e.g., a movie). The manifest data sources may include different video quality levels (of the video portion of the playback), different audio quality levels (of the audio portion of the playback), and available subtitles can be selected to generate a manifest file. For instance, the video quality levels may include 4K, 1080p, 720p, and 480i resolutions; and the audio quality levels may include 128 Kbps, 64 Kbps, 32 Kbps, and 16 Kbps bitrates. The available subtitles may include, for example, Spanish, Japanese, English, and Chinese. Each fragment of video at the different quality level, and each fragment of audio at the different quality level can be associated with a URL that a client device can use to access the fragment.

Although the above examples are described each quality level corresponding to a specific resolution or bitrate, in other implementations, one or more of the quality levels for a type of content can span multiple resolutions/bitrates. For example, a high video quality level may correspond to 8K and 4K resolutions, a medium video quality level may correspond to 1080p and 720p resolutions, and a low video quality level may correspond to 480i resolution.

Referring back to FIG. 4, various scenarios of content requests will now be described. In a first scenario, client device 405a and client device 405b may request the same content at about the same time. The time of day of the request can be at a time when network traffic is light. Both client devices 405a and 405b may have the same internet service provider, and be geographically located in the same area. As such, the only significant difference between the requests can be the client device characteristics. For example, client device 105a may support only up to 1080p video, whereas client device 405b may support up to 4K resolution. As such, manifest file 420a may include metadata for video fragments at 1080p resolution, whereas manifest file 420a may include metadata for video fragments at 4K resolution.

In some implementations, the manifest file generated for a content request may include metadata for fragments at or below the determined quality level. In other words, the manifest file excludes metadata associated with fragments of the requested media content having a higher quality level than the determined quality level, but can include metadata associated with fragments of the requested media content having a lower quality level than the determined quality level. This may allow the client device to perform client-side adjustments by giving the client device options to select various quality levels with a ceiling level determined by the server. The manifest file can also exclude metadata associated with fragments of the requested media content having a lower quality level than a threshold quality level. For example, certain users such as enterprise users may have a quality-of-service requirement of a certain minimum threshold quality level. In such scenarios, the metadata of the requested media that does not meet the threshold quality level can be omitted.

In a second scenario, client device 405b may request the content at a later time of the day when network congestion is more likely to occur. Based on the difference in the time of day, content server 425 may predict a longer retrieval time for client device 405b. As a result, although client device 405b can support up to 4K resolution, the quality level determined for the request from client device 405b may map to a 1080p resolution to reduce the playback latency in anticipation of the network congestion. Hence, in this second scenario, both manifest files 120a and 120b may include metadata for video fragments at 1080p resolution.

In a third scenario, client device 405a may request the content over a cellular network with Internet data communications provided by a mobile network operator. Based on the difference in ISP, content server 425 may predict a longer retrieval time for client device 405a. As a result, although client device 405a can support up to 1080p resolution, the quality level determined for the request from client device 405a may map to a 720p resolution to reduce the playback latency in anticipation of the slower ISP. Hence, in this third scenario, manifest file 120a may include metadata for video fragments at 720p resolution.

By controlling the generation of the manifest files provided to client devices based on the predicted content retrieval times, the content server can effectively minimize the playback latency by limiting the available quality levels of content fragments that the client device can access. Fragments at the missing quality levels generally cannot be requested by the client device, because the requests for them cannot be properly made due to missing information (e.g., missing URLs) from the respective manifest files. In some implementations, if manifest files are not used or if a client device is able to make a request specifying a requested quality level of the media content that is higher that the quality level determined by the content server, and content server may override the requested quality level and provide the media content at the quality level determined by the content server. In some implementations, if the quality level mapped to the predicted content retrieval time is below a threshold quality level, the content server may also override the machine learning model, and provide the requested media content at the threshold quality level. For example, certain clients may have a quality-of-service that requires a minimum threshold quality level, and the machine learning model can be overridden to meet the quality-of-service.

Figure 6:
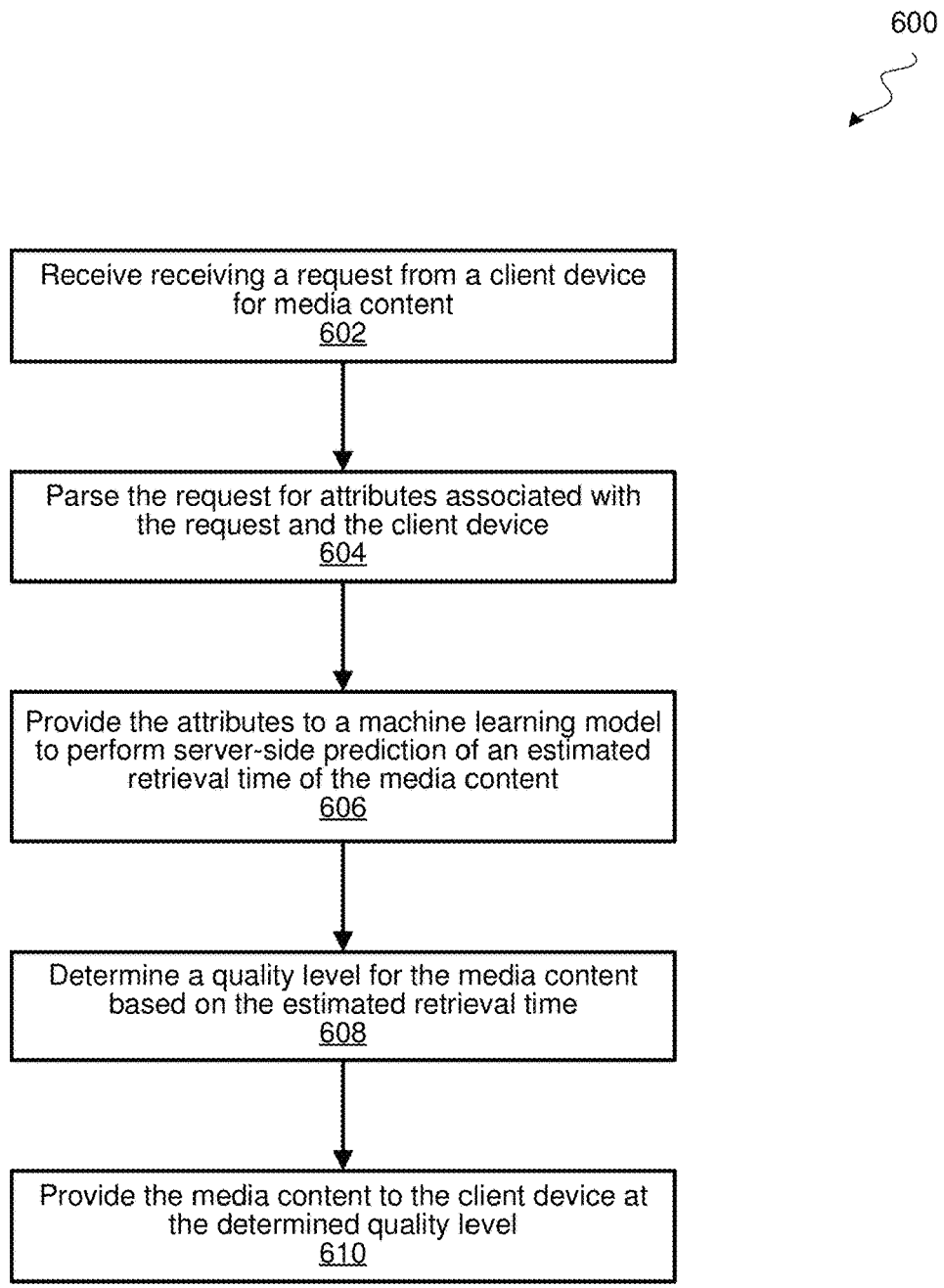
FIG. 6 illustrates an example of a flow diagram of a process for media content delivery.

FIG. 6 illustrates a flow diagram of an example of a process 600 for content delivery using the techniques disclosed herein. Process 600 can be performed, for example, by a computing system having one or more processors, and a memory storing instructions implementing process 600. The computing system can be used, for example, to implement a content server such as content server 125 and/or 425. In some implementations, process 600 can be implemented on a computer-readable medium that is executable by one or more processors of a computing system to process content requests.

Process 600 may begin at block 602 by receiving a request from a client device for media content. For example, the request can be received by a content delivery network (CDN). The media content being requested can be image content, audio content, and/or video content. The client device can take on various form factors, and different client devices may have different capabilities in terms of display resolution, audio playback capability, media decoders, memory and processing capacity, etc. Different client devices may also connect to the CDN using different service providers and/or communication networks, and can be geographically close or far away from the CDN servers. Hence, content retrieval times for different client devices can vary greatly depending on any number of factors.

At block 604, the request is parsed for attributes associated with the request and the client device. The attributes associated with the request may include time information of the request, type of media content being requested, and/or network information. The time information may include date, time (e.g., hour of the day), and/or day of week of when the content request was made. The type of media content being requested may include video, audio, image, as well as a particular file format for the media content (e.g., to be compatible with a media player), and/or the original resolution/quality of the content being requested. The network information may include IP address, ISP provider, and/or uniform resource locator (URL) of content being requested. The attributes associated with the client device may include a client device type (e.g., mobile phone, tablet, set top box, television, etc.), and/or location information of the client device.

At block 606, the parsed attributes can be provided to a machine learning model to perform server-side prediction of an estimated retrieval time of the media content. In some implementations, the machine learning model can be a gradient boosted tree model that has been trained using a Poisson loss function or a negative binomial loss function. The machine learning model can be trained using historical contextual information of media content requests across multiple client devices and multiple client device types. In some implementations, the machine learning model can be retrained periodically (e.g., monthly, quarterly, bi-annually, etc.) using contextual information of requests that have not been subjected to the machine learning model. The output of the machine learning model giving a set of attributes parsed from a content request is an estimated retrieval time for the requested content.

At block 608, a quality level for the media content is determined based on the estimated retrieval time. For example, the media content can be available in various versions having different bitrates and/or resolutions. The various versions can be grouped into different quality levels (e.g., high, medium, low). Each quality level may correspond to one version of the media content, or may correspond to multiple versions of the media content. For example, a video resolution of 4K, 1080p, 720p, and 480i can each correspond to a different quality level. In other implementations, 4K can correspond to a high quality level, 480i can correspond to a low quality level, and 1080p and 720p can be grouped together as the medium quality level. Each quality level is also mapped to a range of estimated retrieval times. Generally, longer estimated retrieval times are mapped to a lower quality level to minimize the playback latency.

At block 610, the media content is provided to the client device at the determined quality level. For example, video content can be streamed to the client device at the resolution mapped to the estimated retrieval time, and audio content can be streamed to the client device at the bitrate mapped to the estimated retrieval time. In some implementations, providing the media content to the client device may include generating a manifest file for the requested media content, and providing the manifest file to the client device to enable the client device access to the media content. The manifest file can include data (e.g., metadata such as URLs) associated with fragments of the requested media content at the determined quality level. In some implementations, the manifest file may exclude data associated with fragments of the requested media content having a higher quality level than the determined quality level, but can include data associated with fragments of the requested media content having a lower quality level than the determined quality level.

Figure 7:
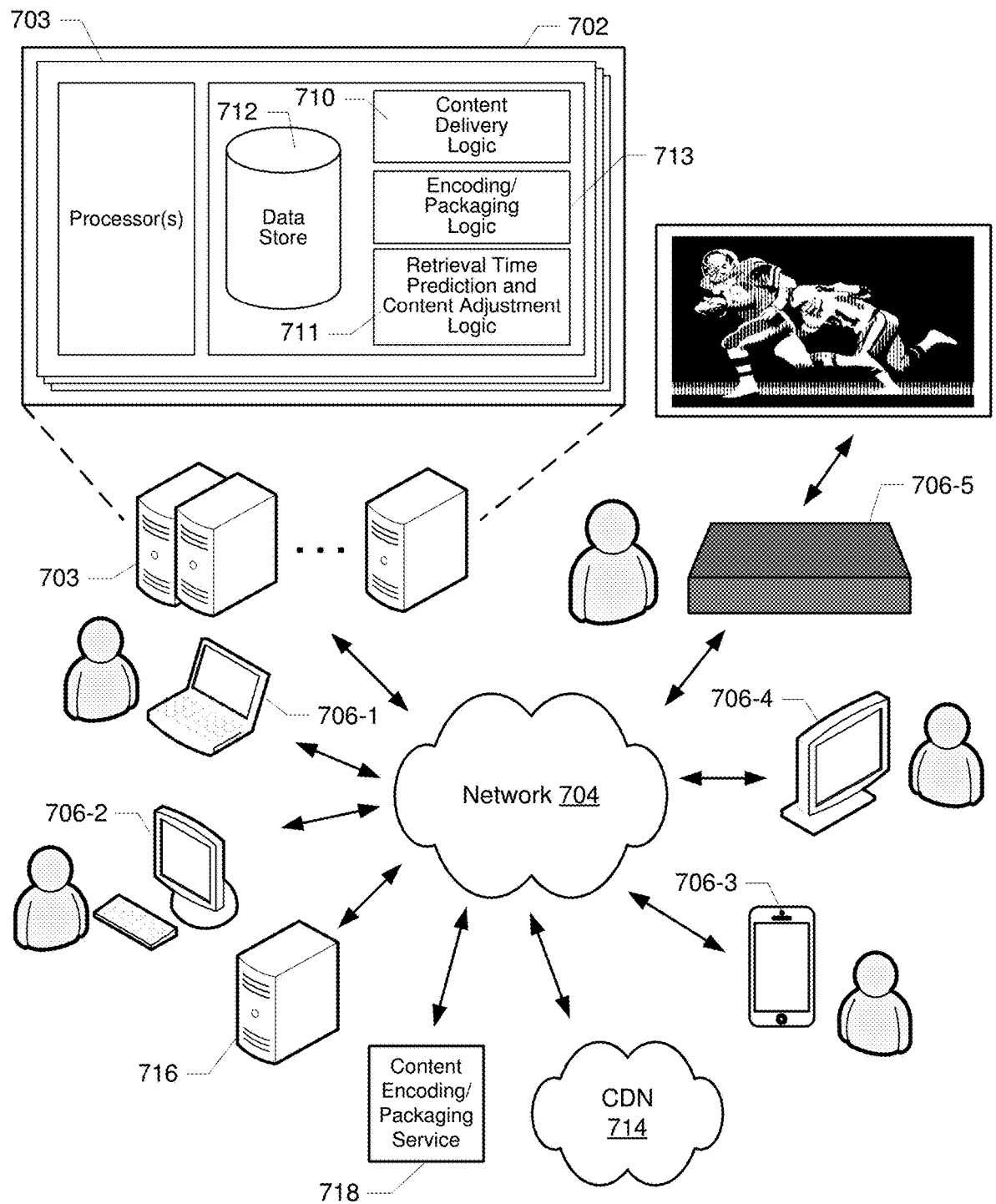
FIG. 7 illustrates an example of a computing system according to certain aspects of the disclosure.

FIG. 7 illustrates an example of a computing environment in which a video content service 702 can provide streaming content via network 704 to a variety of client devices (706-1 through 706-5) in accordance with the techniques described herein. Content service 702 may conform to any of a wide variety of architectures such as, for example, a services platform deployed at one or more co-locations, each implemented with one or more servers 703. Network 704 represents any subset or combination of a wide variety of network environments including, for example, TCP/IP or UDP/IP-based networks, telecommunications networks, wireless networks, satellite networks, cable networks, public networks, private networks, wide area networks, local area networks, the Internet, the World Wide Web, intranets, extranets, and so on. Client devices 706 may be any suitable device capable of connecting to network 704 and consuming content provided by service 702. Such devices may include, for example, mobile devices (e.g., cellphones, smartphones, and tablets), personal computers (e.g., laptops and desktops), set top boxes (e.g., for cable, satellite, and online systems), smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 702. Alternatively, such resources may be independent of content service 702, e.g., on a platform under control of a separate provider of computing resources with which content service 702 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

For ease of explanation, content service 702 is described as if it is integrated with the platform(s) that encodes, packages, and provides the content to client devices. However, it will be understood that content service 702 may provide access to content in conjunction with one or more content delivery networks (e.g., CDN 714) that may or may not be independent of content service 702. In addition, the source(s) of the content (and/or the resources used to encode and package the content) may or may not be independent of content service 702 (e.g., as represented by content provider server 716 and content encoding/packaging service 718). The range of variations known to those of skill in the art are contemplated to be within the scope of this disclosure.

It should also be noted that implementations are contemplated in which, in addition to content delivery logic 710 (which facilitates various aspects of content delivery to client devices 706), content service 702 may include other types of logic. For example, encoding and packaging logic 713 may encode content using any of a variety of video encoding standards such as, for example, AVC (H.264), HEVC (H.265), AV1, VP8, VP9, etc., as well as any of a variety of file formats including, for example, MP4, CMAF, etc. Content may be packaged and delivered using various streaming technique such as, for example, MPEG-DASH (Dynamic Adaptive Streaming over HTTP), Apple's HLS (HTTP Live Streaming), Microsoft's Smooth Streaming, or Sye, to name a few representative examples. Delivery of the encoded content may be performed using the user datagram protocol (UDP) of the Internet protocol (IP). As will be appreciated, the use of UDP may be advantageous for the delivery of media content depicting live events given its low latency when compared to the transport control protocol (TCP). It should be noted that the techniques described herein are compatible with a wide range of content services, media players, DRM systems, encryption technologies, streaming technologies, and codecs, the details of which are known to those of skill in the art.

Content service 702 may also include retrieval time prediction and content adjustment logic 711 to predict playback latencies based on contextual information from the content requests, and adjust the content quality accordingly. Logic 711 can utilize, for example, a machine learning model to predict playback latencies based various information about the request and the client device requesting the content. The machine learning model can be a gradient boosted tree model, and can be retrained periodically.

In addition to providing access to video content, content service 702 may also include a variety of information related to the video content. Alternatively, such information associated with and/or about the content, as well as the content itself may be provided and/or hosted by one or more separate platforms, e.g., CDN 714. It should be noted that, while logic 710 and data store 712 are shown as integrated with content service 702, implementations are contemplated in which some or all of these operate remotely from the associated content service, and/or are under the control of an independent entity. From these examples, those of skill in the art will understand the diversity of use cases to which the techniques described herein are applicable.

In addition to providing access to video content, content service 702 may also include a variety of information related to the video content (e.g., other associated metadata and manifests in data store 712 to which service 702 provides access). Alternatively, such information about the content, as well as the content itself may be provided and/or hosted by one or more separate platforms, e.g., CDN 714, service 718. It should be noted that, while logic 710, 711, and 713, and data store 712 are shown as integrated with content service 702, implementations are contemplated in which some or all of these operate remotely from the associated content service, and/or are under the control of an independent entity. For example, logic 711 and 713 may be implemented by encoding/packaging service 718. From these examples, those of skill in the art will understand the diversity of use cases to which the techniques described herein are applicable.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 5 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method performed by a content delivery server, the method comprising:
   obtaining training data by:
      collecting information on historical requests from client devices for streaming video content, and historical content retrieval times for the historical requests; and
      extracting a set of attributes from the historical requests;
   training a gradient boosted tree machine learning model using the set of attributes and the historical content retrieval times to perform server-side prediction of estimated retrieval times;
   receiving a new request to stream video content from a client device;
   providing attributes of the new request to the gradient boosted tree machine learning model to predict an estimated retrieval time for the new request;
   mapping the estimated retrieval time for the new request to a resolution for the requested video content; and
   streaming the requested video content to the client device at the resolution mapped to the estimated retrieval time.

2. The method of claim 1, wherein the gradient boosted tree machine learning model is trained using a Poisson loss function.

3. The method of claim 1, where the gradient boosted tree machine learning model is retrained monthly using new requests that have not been processed by the gradient boosted tree machine learning model.

4. The method of claim 1, wherein the attributes include time information of the new request, network information, and client device information.

5. A method comprising:
   receiving a request from a client device for media content;
   parsing the request for attributes associated with the request and the client device;
   providing the attributes to a machine learning model to perform server-side prediction of an estimated retrieval time of the media content;
   determining a quality level for the media content based on the estimated retrieval time; and
   providing the media content to the client device at the determined quality level.

6. The method of claim 5, wherein the machine learning model is a gradient boosted tree model.

7. The method of claim 6, wherein the gradient boosted tree model is trained using a Poisson loss function or a negative binomial loss function.

8. The method of claim 5, wherein the machine learning model is trained using contextual information of media content requests across multiple client devices and multiple client device types.

9. The method of claim 8, wherein the machine learning model is retrained periodically using new requests that have not been processed by the machine learning model.

10. The method of claim 5, wherein the attributes associated with the request includes time of request information, type of media content being requested, and network information.

11. The method of claim 5, wherein the attributes associated with the client device includes a client device type and location information of the client device.

12. The method of claim 5, comprising:
   generating a manifest file for the requested media content, the manifest file including data associated with fragments of the requested media content at the determined quality level; and
   providing the manifest file to the client device.

13. The method of claim 12, wherein the manifest file excludes data associated with fragments of the requested media content having a higher quality level than the determined quality level.

14. The method of claim 12, wherein the manifest file excludes data associated with fragments of the requested media content having a lower quality level than a threshold quality level.

15. The method of claim 5, wherein the request from the client device specifies a requested quality level of the media content, and wherein the determined quality level overrides the requested quality level.

16. The method of claim 5, wherein determining the quality level for the media content further includes overriding the machine learning model to set the determined quality level at a threshold quality level when the estimated retrieval time maps to a quality level below the threshold quality level.

17. The method of claim 5, wherein the media content includes one or more of image content, audio content, or video content.

18. A computing device comprising:
   one or more processors coupled to a memory storing instructions, which when executed by the one or more processors, cause the computing device to perform operations including:
      receiving a request from a client device for media content;
      parsing the request for attributes associated with the request and the client device;
      providing the attributes to a machine learning model to perform server-side prediction of an estimated retrieval time of the media content;
      determining a quality level for the media content based on the estimated retrieval time; and
      providing the media content to the client device at the determined quality level.

19. The computing device of claim 18, wherein the machine learning model is a gradient boosted tree model that is trained using a Poisson loss function.

20. The computing device of claim 19, wherein the machine learning model is retrained periodically using new media content requests that have not been processed by the machine learning model.

21. The computing device of claim 18, wherein the attributes include one or more of time information of the request, type of media content being requested, network information, client device type, and location information of the client device.

22. The computing device of claim 18, wherein the operations further include:
   providing a manifest file for the requested media content to the client device, the manifest file including data associated with fragments of the requested media content at the determined quality level.

\* \* \* \* \*